United States Patent
Kappele

(10) Patent No.: US 6,174,357 B1
(45) Date of Patent: Jan. 16, 2001

(54) PIGMENT-BASED INK COMPOSITIONS

(75) Inventor: William David Kappele, Anacortes, WA (US)

(73) Assignee: Lexmark International, Inc., Lexington, KY (US)

(*) Notice: Under 35 U.S.C. 154(b), the term of this patent shall be extended for 0 days.

(21) Appl. No.: 09/357,043

(22) Filed: Jul. 20, 1999

(51) Int. Cl.$^7$ .................................................. C09D 11/02
(52) U.S. Cl. ..................................... 106/31.77; 106/31.76; 106/31.78; 106/31.86; 106/31.87
(58) Field of Search .......................... 106/31.76, 31.77, 106/31.78, 31.86, 31.87

(56) References Cited

U.S. PATENT DOCUMENTS

| | | | |
|---|---|---|---|
| 5,100,469 | 3/1992 | Pontes et al. | 106/31.86 |
| 5,376,169 | 12/1994 | Hotomi et al. | 106/31.73 |
| 5,501,726 | * 3/1996 | Yui et al. | 106/31.86 |
| 5,529,617 | * 6/1996 | Yamashita et al. | 106/31.87 |
| 5,531,815 | 7/1996 | Gundlach et al. | 106/31.59 |
| 5,534,050 | 7/1996 | Gundlach | 106/31.58 |
| 5,622,549 | * 4/1997 | Yui et al. | 106/31.86 |
| 5,714,538 | 2/1998 | Beach et al. | 524/504 |
| 5,719,204 | 2/1998 | Beach et al. | 523/161 |
| 5,746,816 | 5/1998 | Xu | 106/31.13 |
| 5,810,915 | 9/1998 | Nagai et al. | 106/31.43 |
| 5,879,439 | 3/1999 | Nagai et al. | 106/31.78 |
| 5,882,390 | 3/1999 | Nagai et al. | 106/31.78 |
| 5,900,899 | * 5/1999 | Ichizawa et al. | 106/31.86 |
| 5,925,692 | * 7/1999 | Kappele et al. | 106/31.86 |
| 5,969,005 | * 10/1999 | Yamashita et al. | 106/31.86 |
| 6,051,645 | * 4/2000 | Suzuki et al. | 524/500 |

* cited by examiner

*Primary Examiner*—Helene Klemanski
(74) *Attorney, Agent, or Firm*—Jacqueline M. Daspit; Jackie Zurcher

(57) ABSTRACT

An ink composition comprises red pigment and a carrier mixture. The carrier mixture comprises a bishydroxy terminated thioether and a lactam.

28 Claims, No Drawings

PIGMENT-BASED INK COMPOSITIONS

TECHNICAL FIELD

This invention relates to ink compositions. More particularly, the invention relates to pigment-based ink compositions comprising a red pigment, a bishydroxy terminated thioether and a lactam. The invention further relates to a method of providing a large color gamut by increasing the chroma of an ink.

BACKGROUND ART

It is desirable to have a large color gamut for color printing. "Color gamut" refers to the number of colors which may be reproduced from a set of primary colors. The larger the color gamut, the more colors which can be successfully reproduced. The color gamut is a function of the chromas of the primaries. "Chroma" refers to the degree of saturation of the color. Providing high chroma primary inks will provide a large color gamut. A chroma value of a primary ink is determined by its colorant and its formulation.

Pontes et al., U.S. Pat. No. 5,100,469, disclose an ink composition comprising a colorant, a liquid carrier, and an additive selected from the group consisting of mesoerythritol and salts thereof, and $RC(CH_2OH)_3$ and salts thereof. Pontes et al. further disclose the composition may comprise from about 1.0% to about 5.0%, by weight, humectant, and that suitable humectants include glycerol, thiodiglycols, ethylene glycol, diethylene glycol and 2-pyrrolidone. Pontes et al. teach colorants may include direct dyes, acid dyes, reactive dyes and polymeric dyes.

Hotomi et al., U.S. Pat. No. 5,376,169, disclose a recording solution for ink jetting comprising pigment, resin, an additive selected from the group consisting of alginates and bomeols, and at least 55%, by weight, of a non-aqueous solvent. Hotomi et al. further teach the non-aqueous solvent may be selected from monoethylene glycol, monobutyl ether, diethylene glycol monobutyl ether, triethylene glycol monobutyl ether, monopropylene glycol monobutyl ether, dipropylene glycol monobutyl ether, tripropyl monobutyl ether, butyl cellosolve and 2-pyrrolidone. The recording solution of Hotomi et al. may further comprise from 7% to 45%, by weight, of a compound selected from water, dithioethanol, formamide, glycerin, ethylene carbonate and methane sulfonic acid.

Gundlach et al., U.S. Pat. No, 5,531,815, disclose ink compositions comprising a betaine zwitterionic base, a quasisurfactant penetrant and, optionally, solvents such as n-methylpyrrolidione, thiodiethanol, ethylene glycol, trimethylol propane, sulfolane and glycerine.

Gundlach et al., U.S. Pat. No. 5,534,050, disclose ink compositions comprising an acetylenic polyalkylene oxide and a quasisurfactant penetrant. Gundlach et al. disclose solvents such as cyclohexyl pyrrolidone and co-solvents such as n-methylpyrrolidinone, thiodiethanol, ethylene glycol, trimethylol propane, sulfolane, and glycerine.

Nagai et al., U.S. Pat. No. 5,882,390, disclose a recording ink composition comprising a colorant which includes at least one phthalocyanine compound, a dispersant and/or surfactant, water and a humectant. Nagai et al. further disclose that humectants include water-soluble organic solvents such as diethylene glycol, thiodiethanol, polyethylene glycol, glycerol, N-methyl-2-pyrrolidinone, N-hydroxy-2-pyrrolidone, 2-pyrrolidone and 1,3-dimethylimidazolidinone.

Nagai et al., U.S. Pat. No. 5,879,439, disclose a recording ink composition comprising a colorant comprising a pigment and a polymeric dye, a dispersant and/or surfactant, water, and a water-soluble organic solvent such as diethylene glycol, thiodiethanol, polyethylene glycol, triethylene glycol, glycerol, 1,2,6-hexanetriol, 1,2,4-butanetriol, 3-methylpentane-1,3,5,-triol, 1,5-pentanediol, N-methyl-2-pyrrolidone, N-hydroxy ethyl-2-pyrrolidone, 2-pyrrolidone and 1,3-dimethylimidazolidinone.

Nagai et al., U.S. Pat. No. 5,810,915 disclose an aqueous ink composition including a dye component containing a water-soluble xanthene dye or a water-soluble phthalocyanine dye. Nagai et al. teach that the composition may further comprise water-soluble organic solvents such as diethylene glycol, thiodiethanol, polyethylene glycol, triethylene glycol, glycerol, 1,2,6-hexanetriol, 1,2,4-butanetriol, 3-methylpentane-1,3,5-triol, 1,5-pentanediol, N-methyl-2-pyrrolidone, N-hydroxy-ethyl-2-pyrrolidone, 2-pyrrolidone and 1,3-dimethylimidazolidinone.

There is a need for providing high chroma primary inks that will provide a large color gamut.

SUMMARY OF THE INVENTION

Accordingly, it is an object of this invention to provide pigmented ink with high chroma.

It is another object of this invention to provide pigment compositions comprising red pigment which have high chroma values.

In accordance with one aspect of the present invention, ink compositions comprise red pigment and a carrier mixture comprising a bishydroxy terminated thioether and a lactam.

In accordance with another aspect of the present invention, there is provided an ink composition comprising Pigment Red 81, 2-pyrrolidone and 2, 2'-thiodiethanol.

In accordance with another aspect of the present invention, methods of increasing the chroma of an ink composition comprising a red pigment comprise the step of adding to the ink composition a carrier mixture comprising a bishydroxy terminated thioether and a lactam.

It has now been found that a carrier mixture comprising a bishydroxy terminated thioether and a lactam can increase the cliroma of an ink containing red pigment. The high chroma ink provides for a larger color gamut.

These and additional objectives and advantages will be more fully apparent in view of the following description.

DETAILED DESCRIPTION

It has been found that it is possible to increase the chroma of an ink comprising red pigment by incorporating a carrier mixture. The carrier mixture comprises a bishydroxy terminated thioether and a lactam.

Suitable bishydroxy terminated thioethers have the formula HO-(A)-S-(A)-OH, wherein each A is independently an aryl group or a $(CR_2)_x$, wherein each R is independently a hydrogen, $C_{1-6}$ alkyl group, aryl group or halogen, and x is an integer from about 1 to about 7. A preferred bishydroxy terminated thioether is 2,2'-thiodiethanol.

Lactams are cyclic amides. Suitable lactams for use herein include five-member ring lactams such as 2-pyrrolidone, 1-methyl-2-pyrrolidone, 1-(2-hydroxyethyl)-2-pyrrolidone, 1,3-dimethyl-2-imidazolidinone and mixtures thereof. Preferably the lactam is 2-pyrrolidone.

The composition comprises a red pigment. Suitable red pigments include Pigment Red 3, Pigment Red 19, Pigment Red 22, Pigment Red 23, Pigment Red 31, Pigment Red 81, Pigment Red 101, Pigment Red 112, Pigment Red 149, Pigment Red 170, Pigment Red 268, Pigment Red 269; preferably the red pigment is Pigment Red 81. The composition generally comprises from about 0.2% to about 10%, preferably from about 0.5% to about 6%, and most preferably from about 1.0% to about 5.0%, by weight of the total ink composition, red pigment.

The ink composition generally comprises, by weight, from about 5% to about 40%, preferably about 20%, total carrier mixture. The ink composition generally comprises from about 1% to about 35%, preferably from about 5% to about 15%, more preferably about 10%, by weight, bishydroxy terminated thioether, and from about 1% to about 35%, preferably from about 5% to about 15%, more preferably about 10%, by weight, lactam. The weight ratio of the bishydroxy terminated thioether to the lactam is generally from about 15:85 to about 85:15, preferably from about 45:55 to about 55:45, and more preferably about 50:50.

The composition may comprise dispersants to prevent the pigment from settling and flocculating in the ink composition. The pigment to dispersant weight ratio is generally from about 1:1 to about 6:1, preferably about 3:1. The composition may comprise from about 0.05% to about 7%, preferably from about 0.1% to about 6%, and most preferably from about 0.2% to about 4.0%, by weight, dispersant.

Polymer dispersants stabilize pigment dispersion in aqueous ink compositions and assist in the redispersion of the pigment after drying out of the nozzle during printer shutdown. Additionally, the polymers provide for inks having good water-fastness and excellent print quality and optical density characteristics. Suitable polymeric dispersants include random, block and branched polymers which are anionic, cationic or nonionic in nature. Suitable polymeric dispersants typically have hydrophilic segments for aqueous solubility and hydrophobic segments for pigment interaction. The polymeric dispersants may be homopolymers, copolymers or terpolymers and may be immiscible or miscible blends.

Graft copolymers which are useful dispersants in ink jet ink compositions comprise:
  (a) a hydrophilic polymeric segment, which preferably incorporates a carboxyl substituent;
  (b) a hydrophobic polymeric segment, which preferably has a molecular weight of from about 400 to about 3,000, and which preferably incorporates a hydrolytically stable siloxyl substituent; and
  (c) a stabilizing segment which preferably has a molecular weight of from about 200 to about 2,000, and which is preferably selected from the group consisting of reactive surfactant macromers, protective colloid macromers and non-siloxyl hydrophobic monomers.

Such polymers are described in Beach et al., U.S. Pat. Nos. 5,714,538 and 5,719,204, incorporated herein by reference.

The hydrophilic portion of the polymer helps control polymer solubility in the ink composition. Generally, the hydrophilic polymeric segment will include acidic functional groups, such as carboxylic or sulfonic acid groups. Suitable hydrophilic polymers will be known to those skilled in the art. Preferred monomers for use in synthesizing the hydrophilic polymeric segment are acrylic acid and methacrylic acid. Preferred hydrophilic segments contain carboxyl substituents. Suitable hydrophilic segments are selected from the group consisting of acrylic polymers, acrylic copolymers, methacrylic polymers, methacrylic copolymer and mixtures thereof. When the hydrophilic segment comprises an acrylic or methacrylic copolymer the additional monomer, i.e. the monomer other than the acrylic or methacrylic monomer, preferably does not interfere with the hydrophilic character of the segment. A suitable additional monomer is styrene.

The hydrophilic polymeric segment comprises from about 20% to about 80% of the entire polymeric dispersant. The hydrophilic polymeric segment must be long enough such that it acts to provide a stabilizing function to the dispersant.

The hydrophobic polymeric segment comprises a polymer or copolymer preferably a polymer or copolymer containing a hydrolytically stable linear or branched siloxyl substituent. This segment functions as the anchor to adsorb the dispersant onto the pigment particle surface.

In a preferred embodiment, the hydrophobic reactant used to form the hydrophobic polymeric segment is selected from acrylate or methacrylate esters, acrylate or methacrylate oxo esters, acrylate or methacrylate thio esters, amide polymers having a siloxyl substituent (e.g., an oligomeric siloxane grafted to a polyacrylate or polymethacrylate), and mixtures thereof. The hydrophobic polymeric segment has a molecular weight of from about 400 to about 3,000, preferably from about 400 to about 2,000, more preferably from about 800 to about 1,200, most preferably about 900. Preferred hydrophobic polymeric segments are acrylol-terminated polydialkylsiloxanes and methacrylol-terminated polydialkylsiloxanes.

The stabilizing segment also acts to help bind the dispersant to the pigment particles as well as to enhance the stabilizing efficacy of the entire polymer. The stabilizing reactant used to form the stabilizing segment is preferably selected from either a reactive surfactant, a protective colloid macromer material or a non-siloxyl hydrophobic monomer. The stabilizing segment includes a moiety, preferably an acrylic group, which enables it to polymerize into the remainder of the polymer. The stabilizing segment has a molecular weight of from about 200 to about 2,000, preferably from about 200 to about 1,000.

Reactive surfactants contain both hydrophobic and hydrophilic moieties and function to affect surface tension and effectively uniformly coat insoluble particles in a dispersion. These materials can have the properties of nonionic or anionic surfactants.

Suitable reactive surfactants include nonylphenoxy poly (ethyleneoxy)-acrylate (containing from 1 to about 40 moles of ethylene oxide), nonylphenoxy poly(ethyleneoxy)-methacrylate (containing from 1 to about 40 moles of ethylene oxide), nonylphenoxy poly(ethyleneoxy)-crotonate (containing from about 5 to about 40 moles of ethylene oxide), bis-[nonylphenoxy poly(ethyleneoxy)]-fumarate (containing from about 5 to about 40 moles of ethylene oxide), phenoxypoly(ethyleneoxy) acrylate (containing from about 5 to about 40 moles of ethylene oxide), perfluoroheptoxypoly (propyloxy) acrylate, perfluoroheptoxypoly (propyloxy) methacrylate, sorbitol acrylate, sorbitol methacrylate, allyl methoxy triethylene glycol ether, monosodium ethylsulfonate monododecyl maleate, sodium allyl sulfonate, sodium methallyl sulfonate, 3-sulfopropyl acrylate, vinyl sulfonate and mixtures thereof.

Protective colloids are reactive polymers derived from cellulose (methyl cellulose, hydroxymethyl cellulose, and hydroxyethyl cellulose), polyvinyl alcohols and polyglycols. These products can provide the protective qualities of methyl cellulose, hydroxyethyl cellulose, or polyglycols without the attendant disadvantages of these products, such as water sensitivity and poor compatibility with certain compounding formulations.

Suitable protective colloid materials include hydroxyethylcellulose acrylate, hydroxyethylcellulose methacrylate, methoxypoly(ethyleneoxy) acrylate (containing from about 5 to about 40 moles of ethylene oxide), methoxypoly (ethyleneoxy) methacrylate (containing from about 5 to about 40 moles of ethylene oxide), methylcellulose acrylate, methylcellulose methacrylate, methylcellulose crotonate, stearyloxypoly(ethyleneoxy) acrylate (containing from 1 to about 40 moles of ethylene oxide), and stearyloxypoly (ethyleneoxy) methacrylate (containing from about 10 to about 40 moles of ethylene oxide) and mixtures thereof.

Non-siloxyl hydrophobic monomers include acrylates and methacrylates which may be derived from long chain aliphatic groups, long chain alcohols, and alkyl aryl alcohols. Examples of such materials would include stearyl acrylate, stearyl methacrylate, lauryl acrylate, lauryl methacrylate, nonylphenol acrylate and nonylphenol methacrylate.

Preferred stabilizing segments include stearyl methacrylate, stearyl acrylate, lauryl methacrylate, lauryl acrylate, nonylphenoxy PEG-10 methacrylate, trimethylsiloxy-terminated PEG 4-5 methacrylate, PPG-4-nonylphenol acrylate, and trihydroperfluoro undecyl methacrylate, particularly preferred is stearyl methacrylate.

The dispersants can be made by free radical polymerization reactions which utilize initiators and chain transfer agents to control the polymer molecular weight. Any conventional free radical initiator and/or chain transfer agent may be used in the present invention as long as they are compatible with the reactants being utilized. The dispersants generally have a molecular weight range of from about 1,500 to about 20,000, preferably from about 2,000 to about 10,000, most preferably about 2,500 to about 6,000.

The ink composition may be an aqueous or a non-aqueous composition. In one embodiment, the ink composition is an aqueous ink composition comprising water, preferably deionized water.

In an aqueous ink composition, the water and the bishydroxy terminated thioether and lactam carrier mixture comprise the aqueous carrier medium. The aqueous carrier medium comprises from about 25% to about 95%, preferably from about 50% to about 95%, more preferably from about 70% to about 90%, by weight of the carrier medium, water and from about 5% to about 75%, preferably from about 5% to about 50%, more preferably from about 10% to about 30%, by weight of the carrier medium, carrier mixture.

The ink compositions of the present invention are manufactured using any suitable techniques. In one embodiment the ink is prepared by nixing pigment, dispersant if included, carrier mixture and deionized water together to form a concentrate. The concentrate is then diluted with water. Additional components may be added to give the desired ink. The ink composition may further comprise additives such as a humectants other than the hydroxyterminated thioether and lactam of the carrier mixture, biocides, fungicides, bactericides; penetrants, surfactants, anti-kogation agents, anti-curling agents, buffers, chelating agents, and anti-bleed agents.

Suitable humectants include ethylene glycol, diethylene glycol, propylene glycol. Suitable chelating agents include sodium ethylene diamine tetraacetate, sodium nitrilotriacetate, sodium hydroxyethyl ethylene diamine triacetate and sodium diethylene triamine pentaacetate. Suitable biocides include benz-isothiazolin-one, methyl-isothizaolin-one, chloro-methyl-isothiazolin-one, sodium dehydroacetate, sodium sorbate, sodium 2-pyridinethiol-1-oxide, sodium benzoate and sodium pentachlorophenol. A preferred anti-bleed agent is 2-(2-butoxyethoxy)ethanol.

Suitable penetrants include 1,2-alkyl diols having from about 4 to about 6 carbon atoms and straight chain 1-hydroxy alkanols having from about 1 to about 5 carbon atoms. Preferred 1,2-alkyl diols penetrants include 1,2-pentanediol and 1,2 hexanediol, while 1-propanol is a preferred 1-hydroxy alkanol penetrant. In one embodiment the ink composition comprises from about 0.1% to about 10.0% of a penetrant comprising a straight chain 1-hydroxy alkanol having from about 1 to about 5 carbon atoms, preferably the penetrant is 1-propanol.

The ink compositions may optionally comprise surfactants to modify the surface tension of the ink and to control the penetration of the ink into the paper. Suitable surfactants include nonionic, amphoteric and ionic surfactants.

As used herein, all ratios and percentages are by weight unless stated otherwise.

EXAMPLES

Example composition 1, a composition in accordance with the invention, and example compositions 2 and 3, prior art compositions, comprise red pigment. The formulations of the ink compositions are set forth in Table 1, below.

TABLE 1

Pigment Red Compositions (weight %)

| Example Composition | Pigment Red 81 | 2-pyrrolidone | 2,2'-Thiodiethanol | Graft Copolymer Dispersant | Deionized Water |
|---|---|---|---|---|---|
| 1 | 3% | 10% | 10% | 1.2% | 75.8% |
| 2 | 3% | 20% | 0% | 1.2% | 75.8% |
| 3 | 3% | 0% | 20% | 1.2% | 75.8% |

The example compositions are tested on five different paper sources: Boise T. Cascade X-90000, Springhill Relay DP, Xerox 4200, Hammermill Title DP, and Fox River 25% cotton. As indicated in Table 2, set forth below, for each paper sample, example composition 1, comprising both a bishydroxy terminated thioether and a lactam in accordance with the present invention, gives a higher chroma value than example compositions 2 and 3 comprising solely lactam or solely bishydroxy terminated thioether, respectively.

TABLE 2

Pigment Red Compositions Chroma Values

| Paper | Example Composition 1 | Example Composition 2 | Example Composition 3 |
|---|---|---|---|
| Boise Cascade X-9000 | 14.9 | 12.9 | 12.2 |
| Springhill Relay DP | 15.1 | 13.1 | 12.6 |
| Xerox 4200 | 13.7 | 13.3 | 13 |
| Hammermill Tidal DP | 13.1 | 11 | 11.1 |
| Fox River 25% Cotton | 16.1 | 14.3 | 14 |

Example compositions 4–6 comprise yellow pigment, while example compositions 7–8 comprise blue pigment, as set forth in below Tables 3 and 4, respectively.

TABLE 3

Pigment Yellow Compositions (weight %)

| Example Composition | Pigment Yellow 74 | 2-pyrrolidone | 2,2'-Thiodiethanol | Graft Copolymer Dispersant | Deionized Water |
|---|---|---|---|---|---|
| 4 | 3% | 10% | 10% | 1% | 76% |
| 5 | 3% | 20% | 0% | 1% | 76% |
| 6 | 3% | 0% | 20% | 1% | 76% |

TABLE 4

Pigment Blue Compositions (weight %)

| Example Composition | Pigment Blue 15:3 | 2-pyrrolidone | 2,2'-Thiodiethanol | Graft Copolymer Dispersant | Deionized Water |
|---|---|---|---|---|---|
| 7 | 3% | 10% | 10% | 0.75% | 76.25% |
| 8 | 3% | 20% | 0% | 0.75% | 76.25% |
| 9 | 3% | 0% | 20% | 0.75% | 76.25% |

As indicated by Tables 5 and 6, below, the compositions comprising yellow pigment and blue pigment do not show the increased chroma exhibited by example 1, the example according to the present invention comprising red pigment, a bishydroxy terminated thioether and a lactam.

TABLE 5

Pigment Yellow Compositions Chroma Values

| Paper | Example Composition 4 | Example Composition 5 | Example Composition 6 |
|---|---|---|---|
| Boise Cascade X-9000 | 10.3 | 10.4 | 10.3 |
| Springhill Relay DP | 9.1 | 9.3 | 9.4 |
| Xerox 4200 | 9.5 | 9.6 | 9.7 |
| Hammermill Tidal DP | 8.5 | 8.7 | 8.9 |
| Fox River 25% Cotton | 11.3 | 11.1 | 11.3 |

TABLE 6

Pigment Blue Compositions Chroma Values

| Paper | Example Composition 7 | Example Composition 8 | Example Composition 9 |
|---|---|---|---|
| Boise Cascade X-9000 | 9.3 | 9.5 | 9.4 |
| Springhill Relay DP | 8.3 | 8.1 | 8.6 |
| Xerox 4200 | 8.9 | 8.7 | 9 |
| Hammermill Tidal DP | 8.3 | 8.3 | 8.4 |
| Fox River 25% Cotton | 10.7 | 10.6 | 10.7 |

Additional embodiments and modification within the scope of the claimed invention will be apparent to one of ordinary skill in the art. Accordingly, the scope of the present invention shall be considered in terms of the following claims, and is understood not to be limited to the details of the methods described in the specification.

What is claimed:

1. An ink composition, comprising
   (a) red pigment
   (b) a dispersant comprising at least one segment selected from the group consisting of acrylol-terminated polydialkylsiloxanes, methacrylol-terminated polydialkylsiloxanes and mixtures thereof, and
   (c) a carrier mixture; wherein the carrier mixture comprises a bishydroxy terminated thioether and a lactam; wherein the level of bishydroxy terminated thioether in the ink composition is from about 1% to about 35%, by weight of the ink composition, and the level of lactam in the ink composition is from about 5% to about 15%, by weight of the ink composition.

2. An ink composition according to claim 1, wherein the lactam is selected from the group consisting of 2-pyrrolidone, 1-methyl-2-pyrrolidone, 1-(2-hydroxyethyl)-2-pyrrolidone, 1,3-dimethyl-2-imidazolidinone and mixtures thereof.

3. An ink composition according to claim 1, wherein the bishydroxy terminated thioether has the formula:

HO-(A)-S-(A)-OH wherein each A is independently an aryl group or $(CR_2)_x$, and wherein each R is independently a hydrogen, $C_{1-6}$ alkyl group, aryl group or halogen, and x is an integer from about 1 to about 7.

4. An ink composition according to claim 1, wherein the red pigment is Pigment Red 81.

5. An ink composition according to claim 4, wherein the composition comprises, by weight, from about 0.2% to about 10% of the Pigment Red 81 and from about 5% to about 40% of the carrier mixture.

6. An ink composition according to claim 1, further comprising from about 0.1% to about 10.0%, by weight, of a penetrant comprising a straight chain 1-hydroxy alkanol having from about 1 to about 5 carbon atoms.

7. An ink composition according to claim 1, comprising from about 0.05% to about 7%, by weight, of the dispersant.

8. An ink composition according to claim 1, comprising from about 15% to about 25%, by weight, of the carrier mixture, and wherein the weight ratio of bishydroxy terminated thioether to lactam is from about 45:55 to about 55:45.

9. An ink composition according to claim 1, wherein the composition is a nonaqueous composition.

10. An ink composition, according to claim 1, wherein the level of bishydroxy terminated thioether in the ink composition is from about 5% to about 15%, by weight of the ink composition the level of lactam in the ink composition is from about 5% to about 15%, by weight of the ink composition, and the weight ratio of bishydroxy terminated thioether to lactam is from about 45:55 to about 55:45.

11. An ink composition according to claim 10, comprising from about 0.05% to about 7%, by weight, of the dispersant, wherein the dispersant comprises:
　i) at least one segment selected from the group consisting of polymers and copolymers of acrylic acid, polymers and copolymers of methacrylic acid and mixtures thereof;
　ii) at least one segment selected from the group consisting of acrylol-terminated polydialkylsiloxanes, methacrylol-terminated polydialkylsiloxanes and mixtures thereof; and
　iii) at least one segment selected from the group consisting of stearyl acrylate, stearyl methacrylate, lauryl acrylate, lauryl methacrylate and mixtures thereof.

12. An ink composition according to claim 11, wherein the ink composition further comprises, from about 0.1% to about 10.0%, by weight, of a penetrant selected from the group consisting of 1,2-alkyl diols having from about 4 to about 6 carbon atoms, straight chain 1-hydroxy alkanols having from about 1 to about 5 carbon atoms and mixtures thereof.

13. An ink composition, comprising:
　(a) Pigment Red 81;
　(b) from about 5% to about 15%, by weight, 2-pyrrolidone;
　(c) from about 1% to about 35%, by weight, 2,2'-thiodiethanol; and
　(d) a dispersant comprising at least one segment selected from the group consisting of acrylol-terminated polydialkylsiloxanes, methacrylol-terminated polydialkylsiloxanes and mixtures thereof.

14. An ink composition, according to claim 13, wherein the total amount of 2-pyrrolidone and 2,2'-thiodiethanol is from about 15% to about 25%, by weight of the total composition.

15. An ink composition, according to claim 13, wherein the dispersant comprises:
　i) at least one segment selected from the group consisting of polymers and copolymers of acrylic acid, polymers and copolymers of methacrylic acid and mixtures thereof;
　ii) at least one segment selected from the group consisting of acrylol-terminated polydialkylsiloxanes, methacrylol-terminated polydialkylsiloxanes and mixtures thereof; and
　iii) at least one segment selected from the group consisting of stearyl acrylate. stearyl methacrylate, lauryl acrylate, lauryl methacrylate and mixtures thereof.

16. An ink composition, according to claim 15, wherein the dispersant comprises:
　i) a methacrylate compound segment selected from the group consisting of polymers and copolymers of methacrylic acid and mixtures thereof;
　ii) a methacrylol-terminated polydialkylsiloxane segment; and iii) a stearyl methacrylate segment.

17. An ink composition, according to claim 13, wherein the weight ratio of 2-pyrrolidone to 2,2'-thiodiethanol is from about 45:55 to about 55:45.

18. An ink composition, according to claim 13, further comprising an additive selected from the group consisting of biocides, penetrants, surfactants, anti-kogation agents, anti-curling agents, chelating agents, anti-bleed agents, buffers and mixtures thereof.

19. An ink composition, according to claim 15, comprising, by weight:
　(a) from about 0.2% to about 10%, Pigment Red 81;
　(b) from about 5% to about 15%, 2-pyrrolidone;
　(c) from about 5% to about 15%, 2,2'-thiodiethanol;
　(d) from about 0.05% to about 7%, dispersant; and
　(e) water;
wherein the weight ratio of bishydroxy terminated thioether to lactam is from about 45:55 to about 55:45.

20. An ink composition, according to claim 19, further comprising from about 0.1% to about 10.0%, by weight, of a pentrant selected from the group consisting of 1,2-pentanediol, 1,2 hexanediol, 1-propanol, and mixtures thereof.

21. A method of increasing the chroma of an ink composition comprising red pigment, comprising the step of adding to the ink composition a carrier mixture comprising:
　a bishydroxy terminated thioether; and
　a lactam;
wherein after the step of adding the carrier mixture the ink composition comprises, by weight from about 1% to about 35% bishydroxy terminated thioether and from about 5% to about 15% lactam.

22. A method according to claim 21, wherein the red pigment is Pigment Red 81.

23. A method according to claim 21, wherein the bishydroxy terminated thioether is thiodiethanol and the lactam is 2-pyrrolidone, and wherein the weight ratio of thiodiethanol to 2-pyrrolidone is from about 45:55 to about 55:45.

24. A method according to claim 23, wherein the total amount of 2-pyrrolidone and 2,2'-thiodiethanol is from about 5% to about 40%, by weight, of the total ink composition.

25. A method according to claim 21, wherein the bishydroxy terminated thioether has the formula:

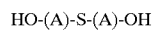

wherein each A is independently an aryl group or $(CR_2)_x$, and wherein each R is independently a hydrogen, $C_{1-6}$ alkyl group, aryl group or halogen, and x is an integer from about 1 to about 7.

26. A method according to claim 21, wherein the ink composition further comprises from about 0.05% to about 7.0%, by weight of the composition, of a terpolymer dispersant.

27. A method according to claim 26, wherein the terpolymer dispersant comprises:
　i) a hydrophilic polymeric segment;
　ii) a hydrophobic polymeric segment comprising a siloxyl substituent; and
　iii) a stabilizing segment prepared from a member selected from the group consisting of reactive surfactant monomers, protective colloid macromers, and non-siloxyl containing hydrophobic monomers.

28. A method according to claim 21, wherein after the step of adding the carrier mixture, the ink composition comprises, by weight, about 10% bishydroxy terminated thioether and about 10% lactam.

* * * * *